Jan. 19, 1960 H. W. ELKIN ET AL 2,921,759
RETRACTABLE LANDING GEAR
Filed Dec. 9, 1955 4 Sheets-Sheet 1

Hugh W. Elkin &
Floyd W. Atkins
INVENTORS.

BY
ATTORNEY.

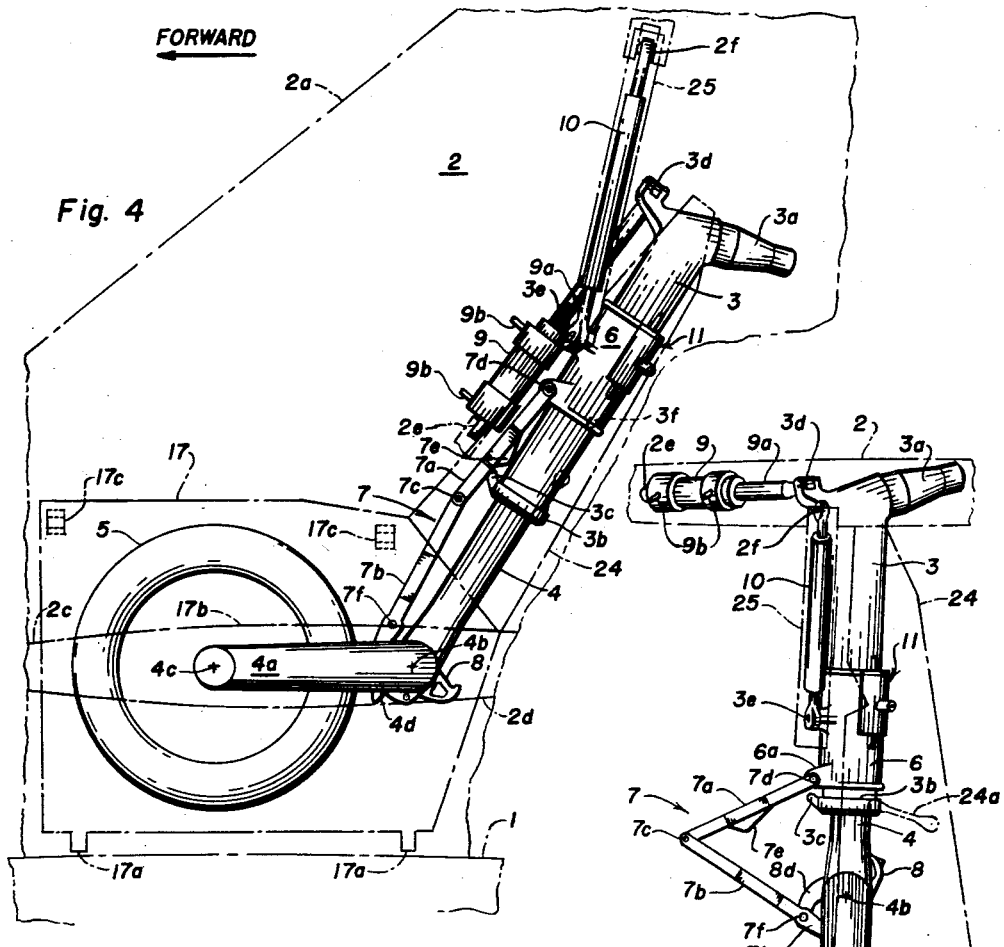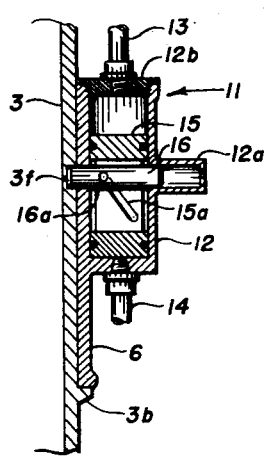

Hugh W. Elkin &
Floyd W. Atkins

INVENTORS.

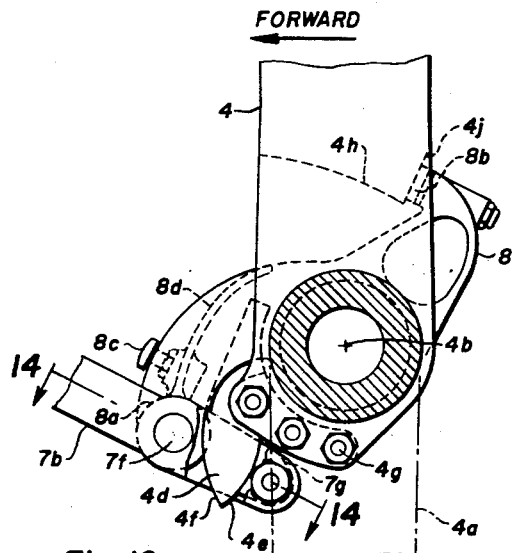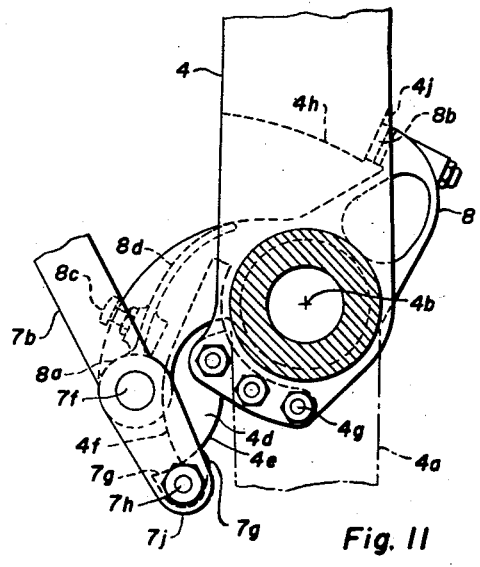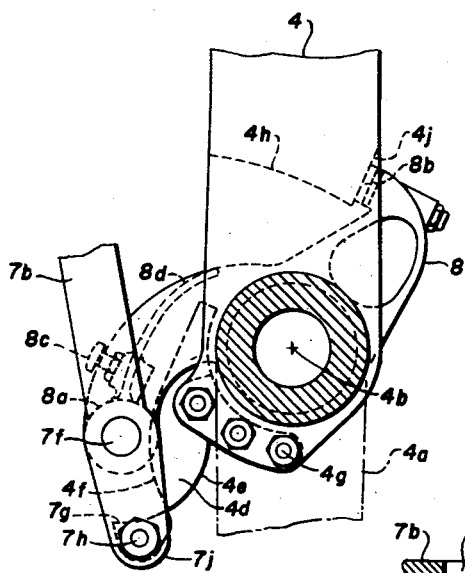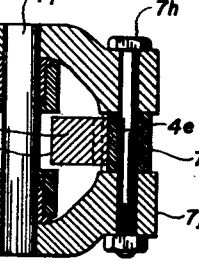

United States Patent Office 2,921,759
Patented Jan. 19, 1960

2,921,759

RETRACTABLE LANDING GEAR

Hugh W. Elkin, Pasadena, and Floyd W. Atkins, San Pedro, Calif., assignors to North American Aviation, Inc.

Application December 9, 1955, Serial No. 552,167

7 Claims. (Cl. 244—102)

The present invention relates in general to landing gears of the retractable type and more particularly to an improved retractable landing gear in which the wheel-carrying strut is articulated to permit more compact and efficient storage within an aircraft wing.

Numerous problems are presented in the construction, support and storage of retractable landing gears within the wings of high speed jet propelled aircraft. Certain of these problems are due in part to the limitations imposed by the relatively thin wings, and to a certain extent by the high sweep-back of their leading edges and the desirability of positioning the landing gear support at a sufficiently sturdy portion of the wing, as well as at a point not too far outboard from the fuselage. While relatively shorter landing gears are permitted by the lower ground clearances of jet propelled aircraft, as distinguished from propeller-driven types, it has been quite difficult to meet all of these requirements even in a comparatively short landing gear and still permit sufficient clearance to retract the gear inwardly toward the fuselage without requiring the stowage of a portion of the wheel and its wheel-carrying strut within the adjacent portion of the fuselage or without projecting to too great an extent beneath the lower surface of the wing.

These and other objections and disadvantages of the prior types or retractable landing gear in such aircraft have been largely overcome and eliminated by the present strut construction for an articulated retractable landing gear wherein the wheel is pivoted to the piston element of the shock absorbing strut in a lockable knee joint arrangement and is automatically unlocked from the piston portion during retraction and rotated forwardly about its knee pivot into a final position in which the wheel lies flat and parallel to the airstream for storage entirely within the thicker portion of the thin wing. The knee articulation is actuated and facilitated by the provision of a sliding collar on the cylinder portion of the shock absorbing strut attached by a fixed length link to the wing structure and which causes the collar to ride up the strut during retraction to thereby draw the torque links upwardly, and subsequent to unlocking, to rotate the attached wheel-carrying portion about its pivot.

It is, accordingly, a major objective of the present invention to provide an improved retractable landing gear for a high speed relatively thin aircraft wing. A corollary object of the invention lies in the provision of an arrangement which permits mounting and retracting a main landing gear assembly into a thin airfoil with a minimum of protrusions, and which protrusions, if any, are so located as to permit minimum streamlined cover fairings to be aligned with the airstream. Another object resides in providing such a landing gear which permits the maximum tire width for a minimum wing thickness. It is also an object to provide a landing gear arrangement in which there is a tendency for the gear to extend by virtue of its own weight and the airloads to which it is subjected, thereby obviating the necessity for an emergency extension system.

It is a still further object to provide an improved retractable landing gear having an articulated and foldable wheel-carrying piston portion which is automatically folded forwardly to lie flat parallel to the airstream as it is retracted and to thereby permit the strut mounting to the wing to be placed nearer to the fuselage than would otherwise be possible. It is a further objective of the present invention to provide an articulated retractable landing gear having an improved fairing door arrangement in which a minimum protruding portion of the wheel-carrying strut is aligned with the airstream and is faired by a streamlined fairing which may be disposed both on the fixed portion of the wing as well as upon the main fairing door.

Other objects and advantages of the present invention, both with respect to its overall arrangement and the details of its respective parts, will become obvious to those skilled in the art after reading the following description, taken in conjunction with the accompanying drawings, forming a part hereof, in which:

Fig. 4 is a bottom plan view looking upwardly toward the landing gear in its retracted position within the wing;

Fig. 5 is a side elevational view of the landing gear in its extended position, similar to that shown in Fig. 2 but to a larger scale;

Fig. 6 is a detailed sectional view of the lock for the collar carried by the cylinder portion of the shock absorbing strut;

Fig. 10 is an enlarged detail view of the pivot lock for the wheel-carrying strut portion in the loaded condition of the landing gear when fully compressed;

Fig. 11 is a similar view with the landing gear in its extended and unloaded condition;

Fig. 12 is a similar view with the landing gear in the partially retracted condition with the wheel-carrying leg portion unhooked but still aligned with the piston portion;

Fig. 13 is a similar view in the fully retracted position with the wheel-carrying leg portion fully bent or folded about the knee pivot; and Fig. 14 is a sectional view of the knee locking components shown in the preceding four figures as taken along the lines 14—14 of Fig. 10.

Figure 1:
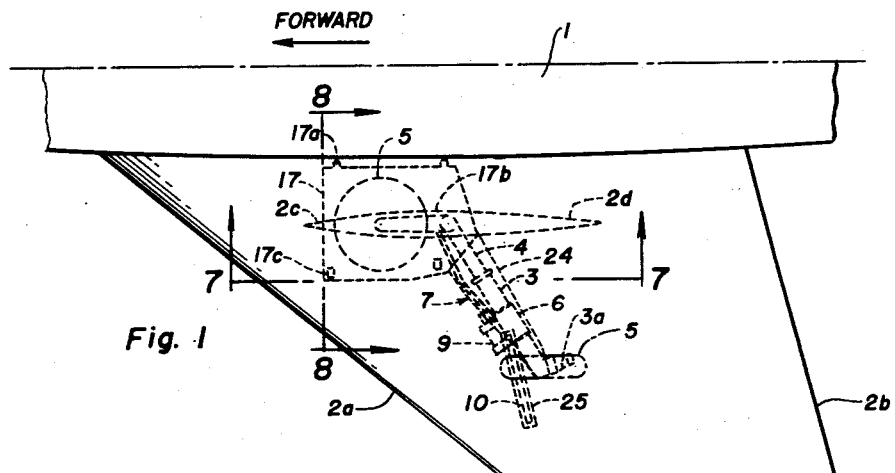
Fig. 1 shows a plan view of an air craft wing and the adjacent portion of the fuselage, to the wing of which a form of the improved landing gear is mounted.
Figure 2:
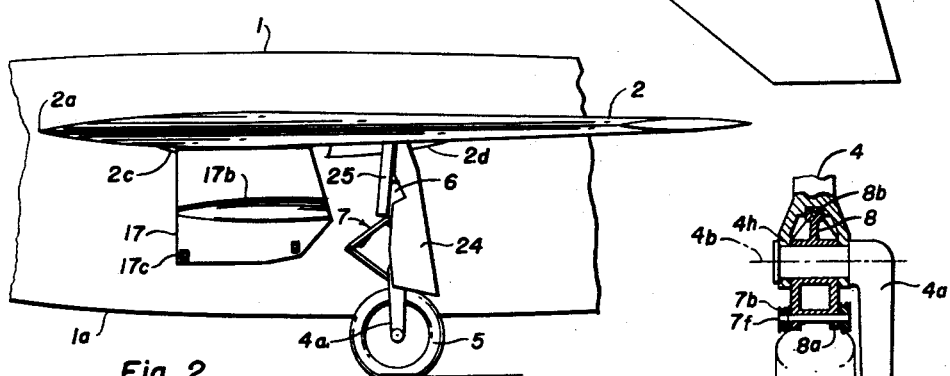
Fig. 2 is a side elevational view of the same with the landing gear in its extended position.
Figure 3A:
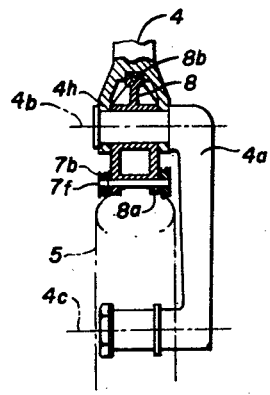
Fig. 3A is an enlarged front elevational view of the wheel-carrying strut portion shown in Fig. 3.
Figure 3:
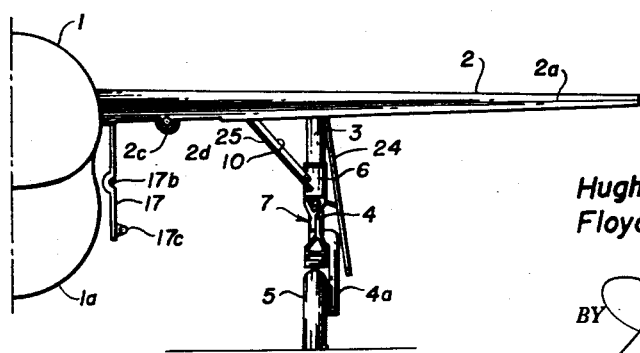
Fig. 3 is a front elevational view of the same.

Referring now to Figs. 1 to 3, inclusive, the numeral 1 indicates the fuselage portion of an aircraft having an under body portion at 1a and having laterally extending wings 2 which are relatively thin, as measured through their vertical thickness, and may be provided with a leading edge 2a. While the leading edge has been shown as highly swept back, the improved landing gear is not necessarily limited to such swept-wing designs but is equally applicable to wings of other plan form. The wing 2 is also provided with a trailing edge 2b which may extend laterally from the fuselage 1 in a direction such as that shown in Fig. 1, or in any other suitable direction.

The improved landing gear comprises essentially an upper cylinder strut portion 3 arranged for pivotal mounting upon the wing structure as by the trunnion mount 3a. The latter may be constructed upon a skewed axis, as indicated in the drawings, whereby in the extended position of the landing gear, with the pivoted knee joint in the aligned position, it extends downwardly substantially vertically beneath the trunnion mounting 3a, as indicated in the dotted lines in Fig. 1. The skewed axis of the trunnion mounting 3a is also such that in the retracted position of the landing gear the main strut portion, as defined by the axis of the cylinder element 3, extends forwardly and inwardly toward the fuselage 1 as indicated in dotted lines in Fig. 1. The piston portion of the landing gear is comprised of two parts, namely, the main piston portion 4 which is adapted to telescope within the cylinder portion 3 for its conventional shock absorbing functions, and the lower leg portion 4a which is provided with a pivotal knee joint at the axis 4b about which the wheel-carrying leg portion 4a is adapted to pivot or fold within certain limits. The wheel-carrying portion 4a is provided at its lower portion with a wheel axle upon the axis 4c upon which the landing gear wheel 5 is rotatably mounted.

A nut-cracker or torque-scissors linkage assembly 7 is pivotally interconnected between the relatively telescoping piston portions 3 and 4 for purposes of preventing relative rotation between these parts about the main axis of the shock absorber strut. The nut-cracker linkage 7 has, however, a translatable pivot connection to the cylinder strut portion 3 in the form of its pivot connection to the sliding collar or sleeve 6, as more particularly shown in Figs. 4 and 5, and in cooperation with which, together with the knee locking fitting 8, to be described below in greater detail, it initiates the folding of the wheel portion 4a and the attached wheel 5.

The landing gear is extended and retracted by an otherwise conventional fluid type actuating motor 9 having a piston rod element 9a pivotally connected to the upper strut portion 3 at the bifurcated pivotal connection 3d. The opposite end of the fluid motor 9 is pivotally mounted upon the wing structure at 2e and the motor is provided with fluid through the flexible conduits 9b. A fixed length strut 10 is pivotally connected at its upper terminal to the wing structure at the pivot 2f and at its lower terminal it is pivotally connected to the collar 6 by means of the pivotal connection 3e. The upper strut portion 3 is provided with a fixed shoulder 3b at its lower terminal and the latter forms a support for the roller 3c as well as for the link 24a from which the fairing door 24 is partially supported. In the extended condition of the landing gear, the collar 6 is positioned by the link 10 and is fixed to the strut portion 3 by the lock 11. After the landing gear assembly has been unloaded and is retracted about the axis of the trunnion 3a by extension of the fluid motor 9 and its piston 9a, the link 10, due to its pivotal connection upon the wing, causes the collar 6 to be moved upwardly along the strut portion 3; the collar movement also draws the nut-cracker assembly 7 with it toward its upper and flattened position as shown in Fig. 4, the pressure of the air within the strut in the meantime tending to maintain the axially extended relationship of the strut portions 3 and 4 to thereby assist in the rotation of the lower nut-cracker link 7b about the pivot 7f. Link 10, sliding collar 6, and nutcracker linkage assembly 7 form a linkage means pivotally interconnecting the aircraft wing 2, strut 3 and wheel-carrying element 4a. At the extreme position, the collar 6 may also be locked to the strut cylinder portion 3 by means of the hydraulically actuated lock 11 shown in detail in Fig. 6.

As indicated above, the nut-cracker linkage assembly 7 interconnects the cylinder strut portion 3 with the wheel-carrying strut portion 4 and, in addition to its conventional purpose in preventing rotation between the strut portions 3 and 4, it serves additionally to actuate the knee lock 8 (with the help of the compressed air within the strut), as well as to draw the lower wheel-carrying portion 4a and the wheel 5 to the bent position during retraction. The nut-cracker linkage assembly 7 is comprised of the upper link 7a and the lower link 7b pivotally interconnected at the intermediate pivot 7c. The upper link 7a is pivotally connected at 7d to the apertured ear or lug portion 6a of the movable collar 6 and an intermediate portion of the upper link 7a is provided with a stop and cam portion 7e which is adapted to engage the roller 3c carried upon the shoulder portion 3b at the lower terminal of the cylinder portion 3. The lower link 7b is bifurcated at its lower portion 7j and is suitably apertured to receive the less widely spaced bifurcated portion 8a of the knee pivot lock fitting 8.

This knee pivot lock fitting 8 is shown to better advantage in Fig. 3A, and Figs. 10 to 14, inclusive, from which it will be noted that its main hub portion is splined, keyed or otherwise fixedly mounted upon the upper transverse pivot portion of the wheel-carrying member 4a with its central axis indicated at 4b. The lower terminal of the piston portion 4 of the shock absorbing strut is bifurcated as at 4h and is suitably provided with the transverse bore within which the upper transverse portion of the wheel-carrying member 4a is rotatably mounted and which carries with it, in its partial rotation about its axis 4b, the attached knee pivot lock fitting 8 which is centrally disposed within the said bifurcated portion 4h of the piston element 4. The lower terminals of the bifurcated portion 4h of the latter are suitably provided with an apertured flange to receive the attachment bolts 4g by means of which the double faced cam 4d is fixedly secured to the forward face of the lower terminal of the piston portion 4. The double faced cam 4d has a front cam surface 4f and a rear cam face 4e converging in a downwardly directed pointed portion. The upper and back portions of the double faced cam fitting 4d are arcuately formed to provide clearance for the rotatable hub portion of the knee lock fitting 8.

The knee lock fitting 8 is formed as a bell-crank or a double lever fitting rockably mounted upon its intermediate hub portion for rocking about the transverse axis 4b. The rearwardly extending arm of the knee pivot lock fitting 8 has an extended stop portion 8b suitably attached to its terminal and the other forwardly extending arm 8d of the bell-crank lever is arcuately formed and apertured at its terminal to receive the pivot pin 7f. The relationship of the apertured bifurcated terminal 8a of the knee pivot lock fitting 8 and that of the embracing bifurcated portion 7j of the lower nut-cracker link 7b is more clearly shown in the cross-section in Fig. 14. From this figure, it will also be noted that beyond the transverse pivot 7f, the bifurcated portions 7j approach each other in a further transversely apertured portion to retain therebetween the shoe element 7g which is also transversely apertured and retained in a fixed position with respect to the lower link 7b by the attachment bolt 7h. The section shown in Fig. 14 is taken as indicated in Fig. 10 in the fully compressed and loaded attitude of the shock absorbing strut, in which the lower link 7b has been rotated to its maximum position in the counterclockwise direction about the pivot 7f. It will be noted that the shoe 7g at the lower end of the bifurcated terminal of the lower link 7b has an outward convex face and an inwardly directed concave face. In Fig. 10, it is the latter or inwardly directed concave face which is in engagement with the rear cam face 4e of the cam fitting 4d. The adjacent arm 8d of the knee pivot lock fitting 8 terminating in the bifurcated portion 8a is arcuately formed having an arcuate web portion upon which is threadedly mounted the adjustable stop screw 8c which limits the rotation of the knee lock fitting 8 in the clockwise direction about the axis 4b, by its engagement with the crotch of the bifurcated portion 4h as indicated in the limit position shown in Fig. 13 in which the wheel-carrying portion 4a has been bent forwardly to its maximum position, in which it is aligned chordwise of the wing in the direction of the airstream. In the opposite rotation of the fitting 8, it is limited by its stop pad 8b striking the stop face 4j of the piston strut portion 4.

Referring now to the hydraulic lock 11 for locking the collar 6 to the cylinder portion 3 (as shown in Fig. 6) it will be noted that the lock comprises essentially an integral cylinder or body portion 12 closed at its upper end by the internally threaded plug or cylinder end 12b. The latter is suitably apertured and threaded to receive the terminal of the fluid conduit 13 and the opposite end of the cylinder is similarly apertured and threaded to receive the fluid conduit 14. Within the bore of the cylinder 12, there is reciprocably mounted the double-ended piston 15 having an intermediate open central portion closed by suitably interconnecting webs provided with angularly disposed guide slots 15a. The cylinder 12 has an offset portion 12a extending outwardly from its intermediate portion adapted to receive the transversely movable barrel or detent pin 16 carrying the transverse pin 16a, the ends of which are disposed within the guide slots 15a. A recess 3f is provided in the wall of the cylinder portion 3 of the shock absorbing strut and with fluid pressure entering through the conduit 13, the piston 15 is forced downwardly to its lower position as indicated in Fig. 6. During this action, the guide slots 15a moving past the ends of the pin 16a, cause the locking pin or barrel 16 to be moved inwardly or toward the left to engage the recess 3f and to lock the collar 6 to the member 3.

Obviously when the conduit 14 is subjected to fluid pressure and the piston 15 is caused to move upwardly within the bore of the cylinder 12, the upwardly moving inclined guide slots 15a cause the locking pin 16 and the attached guide pins 16a to be moved outwardly from the wall of the cylinder portion 3, or to the right in Fig. 6, into the unlocking position in which the pin extends into the offset portion 12a. Inasmuch as the movements of the collar 6 along the cylinder member 3 controls the folding or unfolding of the nut-cracker linkage 7, which in turn controls the locking and unlocking and folding movements of the wheel-carrying portion 4a, it is relatively important that the sleeve 6 be locked in its down position, corresponding to the operative condition of the extended landing gear, to maintain the upper terminal of the nut-cracker linkage assembly in its proper position and to relieve the fixed length link 10 of any forces encountered during landing of the aircraft. It will also be obvious that the fluid conduits 13 and 14 will be suitably interconnected into the hydraulic system and controlled in the proper sequence with respect to the fluid conduits 9b to the actuating motor 9 such that immediately prior to retraction of the landing gear the sleeve or collar downlock 11 is unlocked by subjecting the conduit 14 to the fluid pressure prior to subjecting the fluid motor 9 to the actuating pressure which initiated retraction of the landing gear.

Figure 7:
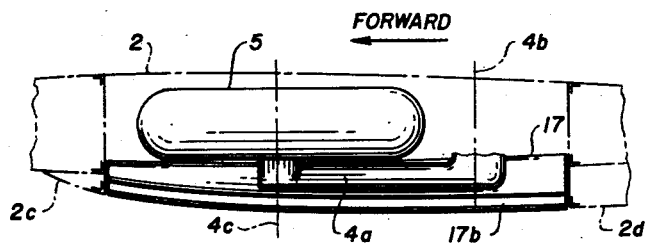
Fig. 7 is a sectional elevational view of the wheel-carrying strut and the wheel in its retracted position within the wing as taken along the lines 7—7 of Fig. 1.
Figure 8:
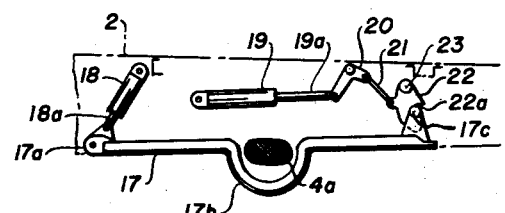
Fig. 8 is a similar sectional view looking rearwardly as taken along the lines 8—8 of Fig. 1 showing the fairing door actuating mechanism in its retracted position.
Figure 9:
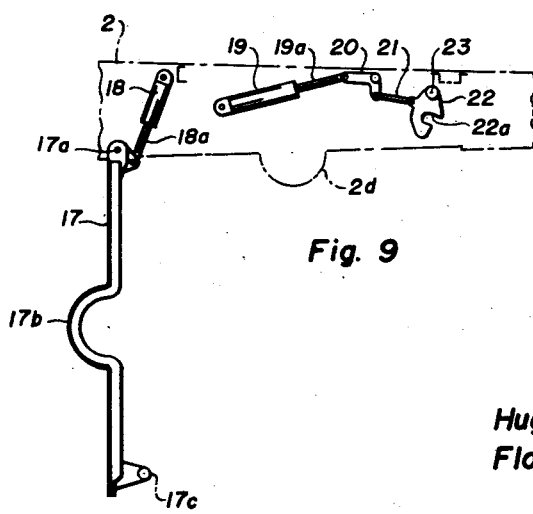
Fig. 9 is a similar view showing the fairing door in its open extended position.

Referring now to Figs. 7, 8 and 9, the landing wheel 5 is shown in its stowed position within the wing 2 in Fig. 7, and suitable streamlined fairings 2c and 2d extend beneath the wing both forward and aft of the wheel well, respectively. Where the combined width (as measured vertically in the retracted position shown in Fig. 7) of the wheel-carrying portion 4a and the wheel 5 is such that a portion is required to project beneath the wing, the fairing portions 2c and 2d may be found desirable and may be suitably aligned with a corresponding streamlined knuckle or faired portion 17b in the main wheel-well door 17. In this manner the maximum tire width for a minimum wing thickness is obtained. The wheel well door may be pivotally mounted upon the wing structure at 17a with an offset lug portion which may be pivotally connected to the piston 18a of the fluid actuating cylinder 18. The main wheel door 17 may preferably be provided with a pin or roller detent element 17c at its outer edge for retention within the recess 22a of the latch 22, pivotally mounted upon the wing structure at 23 for actuation by the fluid motor 19 having the piston 19a pivotally connected to the bell-crank 20, and in turn connected by the link 21 to the latch 22. The door is shown in Fig. 8 in its closed position in which the offset fairing portion 17b embraces the wheel-carrying member 4a and also shows the door and latch actuating mechanism in the closed and locked position in which the latch 22 engages the roller 17c. Fig. 9 shows the door in its fully opened position and with the corresponding extended position of its actuator 18 and the unlatched position of the latching mechanism 19–23.

The landing gear is completely faired within the wing in its retracted position in addition to the main wheel fairing door 17, described above, by the main strut fairing 24 and the link fairing 25 as shown in Figs. 1, and 2 to 5, inclusive. These fairings are suitably attached to the respective components of the landing gear such that they are extended and retracted with these components and when the landing gear is fully retracted into the wing, they adopt flush positions with the wing undersurface as well as with the main door fairing 17. The latter, as indicated above, has its streamlined protruding portion 17b aligned with the fixed wing streamlined portions 2c and 2d, all being disposed chordwise and in the direction of the airstream.

It is considered that an understanding of the operation of the improved articulated landing gear will be obtained from the description of Figs. 10 to 14, inclusive, together with the foregoing description of the relationship of the sliding collar 6 on the strut cylinder member 3 and its effect upon the nut-cracker linkage assembly 7. Reference is made to Fig. 10 which shows the shock absorbing strut in its aligned and extended operative position corresponding to the sleeve 6 being locked adjacent the lower terminal of the strut cylinder member 3 and the nut-cracker linkage folded or collapsed to the position shown in Fig. 5. In this fully extended, loaded, and compressed condition of the landing gear strut, the lower end of the lower nut-cracker link 7b is rotated upwardly and is retained with its shoe 7g bearing against the rear face 4e of the cam 4d of the knee lock fitting 8, which is fixed to the wheel-carrying member 4a. Accordingly, with the landing strut extended, and the landing wheel in rolling engagement with the ground during either landing or take-off runs, and with the strut and the aircraft moving and the aircraft moving toward the left, or forward, as shown in Fig. 10, any obstruction which may be struck by the wheel 5 tending to rotate the wheel and the wheel-carrying portion 4a in the counterclockwise direction about the axis 4b will be opposed by the stop portion 8b in contacting engagement with the corresponding stop face 4j on the rear portion of the piston strut member 4. At the same time, any tendency of the wheel or the wheel-carrying portion 4a to rotate in the clockwise direction about the axis 4b, will be opposed by the shoe 7g bearing against the rear cam face 4e of the cam 4d. All vertical components of resulting forces due to such impacts will be resiliently opposed by the shock absorbing strut in the usual manner.

From the fully extended operative and fully loaded and compressed condition of the landing gear and its shock absorbing strut as indicated in Fig. 10, let us assume that the load is removed and the landing gear is still extended permitting separating movement of the piston strut portion 4 from the cylinder portion 3, under the influence of the compressed air in the strut in which condition the sleeve is still locked to the lower terminal of the cylinder portion 3, permitting the nut-cracker linkage assembly 7 to be straightened out and the lower link 7b to assume the attitude shown in Fig. 11. In this unloaded and fully extended condition of the shock absorbing strut and the pivotally attached nut-cracker linkage, it will be noted that the shoe 7g is still in engagement with the rear cam face 4e of the cam fitting 4d thereby preventing any folding movement of the wheel and the wheel-carrying member 4a. In the relative relationship of the parts as shown in Fig. 11, the wheel 5 and the wheel-carrying member 4a are restrained from rotation in either direction about the axis 4b, its clockwise movement about the axis 4b being opposed by contact of the shoe 7g with the end of the rear face 4e of the cam 4d and its rotation in the other direction is opposed by the engagement of the stop 8b with the abutment surface 4j of the piston strut portion 4. The arrangement outlined in Fig. 11 is that which prevails when the landing gear is in its extended position with the airplane off the ground and in flight either immediately after take-off or while approaching for a landing.

Assuming that Fig. 11 indicates the arrangement of the components immediately after take-off, and it is desired to retract the landing gear, the initial step in retracting the landing gear is to cause the conduit 14 of the collar lock 11 to be subjected to fluid pressure initiating upward movement of the double piston 15 and unlocking of the pin 16 from the recess 3f in the wall of the cylinder strut portion 3. Although still held in its position at the lower terminal of the cylinder portion 3 by the fixed length link 10, the collar 6 is now free to slide axially along the cylinder portion 3 under the influence of the link 10 and to draw the nut-cracker linkage 7 along with it. After the collar 6 has been unlocked, the pressure fluid is exerted into the cylinder of the fluid actuating motor 9 through the respective conduits 9b and forward and inward rotation of the landing gear is initiated about the skewed axis of the trunnion mount 3a. As the lower portion of the cylinder portion 3 of the strut rotates farther away from the link pivotal connection 2f, the fixed length link 10 causes relative axial sliding of the collar 6 with respect to the outer wall of the cylinder portion.

This movement of the collar away from the lower end of the cylinder portion 3, which is opposed and resisted by the air pressure within the strut, causes straightening of the nut-cracker linkage 7 into the position shown in Fig. 12 in which the rotation of the lower link 7b about the pivot 7f is such that the shoe 7g has moved past the rear cam face 4e and has therefore released the locked relationship between the knee pivot lock fitting 8 and the attached wheel-carrying member from the piston strut member 4. As the landing gear is retracted, the collar 6 is drawn upwardly along the cylinder member 3, the said air pressure within the strut resisting the nut-cracker pull about the knee pivot thus keeping the strut extended, and the nut-cracker motion rotates element 8a. The shoe 7g moves past the point where the front and rear faces 4f and 4e converge (as shown in Fig. 12), at which it becomes unlocked; and the outer surface of the shoe starts to slide upwardly along the front face 4f of the cam 4d. Without this resistance in the extended strut, the action in retracting might collapse the strut instead of rotating the wheel-carrying member. As this occurs, the upward movement of the nut-cracker linkage 7, aided by the air pressure in the strut, continues to impart clockwise rotation to the knee lock fitting 8 about its pivot 4b and the attached wheel-carrying strut portion 4a causing the wheel to be offset or tilted away from the fuselage and toward the leading edge 2a of the wing as the main strut portion 3—4 is rotated generally toward the fuselage into its retracted position within the wing. As the collar 6 reaches its maximum upward position along the cylinder portion 3 toward the trunnion mounting 3a, the nut-cracker linkage 7 also approaches its straightened or unfolded position as shown in Figs. 4 and 13. As this occurs, the camming portion 7e on the upper link 7a of the nut-cracker engages and slides over the roller 3c at the lower terminal of the cylinder portion 3 to thereby prevent the nut-cracker from straightening out completely and preventing its being folded again.

As the landing gear may again be extended, the reverse of the above operation occurs, with the roller 3c and the cam 7e insuring that the nut-cracker breaks in the proper direction and initiating straightening of the knee to align the strut portions 4 and 4a, aided by the air pressure within the strut, to successively lock the knee pivot lock fitting 8 and then to lock the collar 6 to the cylinder portion by the hydraulic lock 11. The gear is readily extended, tending to do so by virtue of its own weight and also by the air loads to which it is exposed as soon as the fairing door has been opened and the gear starts to drop from within the wing.

It will, accordingly, be noted that the improved landing gear in being folded for retraction into the wing about its trunnion fitting is also folded within itself in such manner that the wheel is moved forwardly from its normally aligned position to provide sufficient clearance to clear the fuselage and to be stowed, when desirable, within the thickness portion of a relatively thin wing. During this movement the wheel is retracted through a negative angle of incidence with respect to the airstream and in the direction of flight. The resulting negative lift or downward force exerted by the air stream during its extension thereby obviates the necessity of an emergency extension system. The compound folding of the landing gear strut also permits the strut to be mounted, where installation conditions may require, both at the thickest portion of the wing and at a point closer to the fuselage and at which the bending forces imposed upon the wing are reduced to a minimum.

Other forms and modifications of the present invention, both with respect to its general arrangement and the details of its respective components, which may occur to those skilled in the art, after reading the foregoing description, are intended to come within the scope and spirit of this invention as more particularly set forth in the appended claims.

We claim:

1. In combination with an aircraft, a landing gear comprising a strut mounted at an upper terminal to the aircraft, a wheel-carrying element pivotally mounted upon a lower terminal of said strut for swinging secondary movement about said lower terminal in the plane of the wheel coincident with retraction of the strut, means in said aircraft engaging said strut for retracting said strut about its mounting at said upper terminal into a retracted position within the aircraft, and linkage means pivotally connected to said strut, to the aircraft and to said wheel-carrying element, and means for immovably locking said linkage means to said strut upon extension of the same whereby said wheel-carrying element is maintained in an extended operative position with respect to said strut, said linkage including means for imparting a secondary rotative movement to said wheel-carrying element about its pivotal mounting at the lower terminal of said strut sufficient to bring said wheel-carrying element into a position in which it is aligned with the fore and aft aircraft when retracted.

2. In combination with an aircraft having a wing, a strut mounted at an upper terminal to said wing, a wheel-carrying element pivotally mounted upon a lower terminal of said strut for swinging secondary movement about said lower terminal in the plane of the wheel coincident with retraction of the strut, means within said aircraft engaging said strut for retracting said strut about its mounting at said upper terminal into a retracted position within said wing, a wheel rotatably mounted upon said element and linkage means pivotally connected to said strut, to said wing and to said wheel-carrying element, said linkage means including a knee-lock member for preventing rotation of said wheel-carrying element under an applied load when in an operative extended position, said linkage including means for imparting a secondary rotative movement to said wheel-carrying element about its pivotal mounting at the lower terminal of said strut sufficient to rotate said wheel-carrying element into a position in which it is aligned with the direction of the airstream when said wheel is fully retracted whereby an arrangement permitting maximum wheel width for a minimum wing thickness is obtained.

3. In combination with an aircraft, a landing gear comprising a strut mounted at an upper terminal upon the aircraft, a wheel-carrying element pivotally mounted upon a lower terminal of said strut for swinging movement about said lower terminal in the plane of the wheel, means within said aircraft engaging said strut for rotating the landing gear between extended and retracted positions with respect to the aircraft, linkage means operatively connected to said wheel-carrying element, to said strut and to the aircraft, said linkage means including means operative as said strut is retracted by said retracting means for moving said wheel-carrying element both with respect to the aircraft and with respect to said strut and said wheel-carrying element upwardly and forwardly with respect to the direction of flight immediately prior to its retraction within the aircraft whereby subsequent extension of the gear is facilitated by the air loads to which said wheel-carrying portion is subjected.

4. In combination with an aircraft, a retractable landing gear comprising a main shock absorbing strut having a cylinder portion mounted upon the aircraft and a piston portion reciprocably mounted within said cylinder portion, an element slidably mounted upon said cylinder portion, a wheel-carrying element pivotally mounted upon said strut piston portion, power means in said aircraft engaging said stud to retract the same, means interconnecting said aircraft and said slidably mounted element for imparting sliding movement thereto as said strut is retracted, torque scissors pivotally connected to said slidably mounted element and to said wheel-carrying element, and locking means carried by said slidable element for securing the same to the lower end of said strut cylinder portion whereby the wheel-carrying element may be maintained in an extended operative position with respect to said strut piston portion when the main shock absorbing strut is in an extended down position.

5. In combination with an aircraft, a retractable aircraft landing gear comprising a strut cylinder element pivotally mounted upon the aircraft, a strut piston element reciprocably mounted in shock absorbing relationship with respect to said strut cylinder element, a nutcracker linkage assembly normally pivotally mounted upon said strut cylinder element and said strut piston element for preventing relative rotation therebetween in the extended operative condition of the landing gear, power means in said aircraft operatively connected to the landing gear for its extension and retraction, means interconnecting said nut-cracker linkage assembly and the aircraft structure for imparting secondary movement with respect to said strut cylinder element upon retraction of said landing gear by said power means about its pivotal mounting upon the aircraft, a wheel-carrying member pivotally carried upon said strut piston element, the said locking mechanism comprising a locking element pivotally mounted upon said strut piston element and piovtally connected to said nut-cracker linkage assembly, said locking mechanism being attached to said wheel-carrying member and arranged under the influence of said nut-cracker linkage to maintain a fixed relationship with respect to said strut piston element in the normal extended operating condition of said landing gear and to be released from said strut piston element upon retraction of said landing gear by said power means imparting said secondary movement to said nut-cracker assembly.

6. In combination with an aircraft, a retractable landing gear comprising a strut cylinder element pivotally mounted upon the aircraft, a strut piston element reciprocably mounted in shock absorbing relationship with respect to said strut cylinder element, a nutcracker linkage assembly pivotally connected to said strut piston element and having a translatable pivotal connection to said strut cylinder element for preventing relative rotation therebetween in the extended operative condition of the landing gear, a wheel-carrying member pivotally mounted upon said strut piston portion and connected to and operable by said nut-cracker linkage, power means in said aircraft operatively connected to the landing gear for effecting extension and retraction of the same into the aircraft, means interconnecting said nutcracker linkage assembly and the aircraft for pivoting said wheel-carrying element with respect to said strut cylinder element upon retraction of said landing gear by said power means, a landing gear locking mechanism comprising a locking element pivotally mounted upon said strut piston element and pivotally connected to said nutcracker linkage assembly operable to maintain a fixed relationship between said wheel-carrying member and said strut piston element in the normal extending operating position of said landing gear, said locking mechanism being attached to said wheel-carrying member and actuable by said nutcracker linkage coincident with retractive movement of said landing gear to permit secondary pivoting movement of said wheel-carrying element during retraction of the landing gear.

7. In combination with an aircraft, a landing gear arrangement as set forth in claim 6, wherein said locking mechanism comprises a cam mounted on said strut piston portion, and a shoe element mounted on said nutcracker linkage for contacting said cam surface and preventing rotation of said nutcracker linkage under an applied load with the landing gear in an extended position.

References Cited in the file of this patent

UNITED STATES PATENTS

| 2,332,844 | De Muyser | Oct. 26, 1943 |
| 2,478,426 | Satre | Aug. 9, 1949 |

FOREIGN PATENTS

| 726,651 | Germany | Oct. 17, 1942 |
| 988,594 | France | May 9, 1951 |
| 988,595 | France | May 9, 1951 |
| 1,111,782 | France | Nov. 2, 1955 |